United States Patent
Espersen et al.

(10) Patent No.: US 8,224,397 B2
(45) Date of Patent: Jul. 17, 2012

(54) WIRELESS HEADSET WITH VOICE ANNOUNCEMENT

(75) Inventors: Daniel Postborg Espersen, Viby (DK); Tomasz Goldman, Hellerup (DK)

(73) Assignee: GN Netcom A/S (DK)

( * ) Notice: Subject to any disclaimer, the term of this patent is extended or adjusted under 35 U.S.C. 154(b) by 0 days.

(21) Appl. No.: 12/959,699

(22) Filed: Dec. 3, 2010

(65) Prior Publication Data

US 2011/0136547 A1 Jun. 9, 2011

Related U.S. Application Data

(63) Continuation-in-part of application No. PCT/DK2008/000205, filed on Jun. 4, 2008.

(51) Int. Cl.
*H04M 1/00* (2006.01)

(52) U.S. Cl. .............. 455/569.1; 455/550.1; 455/556.1; 455/41.2; 381/85; 704/275

(58) Field of Classification Search .............. 455/569.1, 455/556.1, 550.1, 41.2; 704/275; 340/7.04; 381/85

See application file for complete search history.

(56) References Cited

U.S. PATENT DOCUMENTS

| | | | |
|---|---|---|---|
| 5,893,064 A * | 4/1999 | Kudirka et al. | ............ 704/270.1 |
| 6,434,402 B1 | 8/2002 | Davison et al. | |
| 2002/0068610 A1 | 6/2002 | Anvekar | |
| 2003/0035520 A1 | 2/2003 | Cannon et al. | |
| 2003/0130852 A1 * | 7/2003 | Tanaka et al. | ................. 704/275 |
| 2004/0174249 A1 * | 9/2004 | Kusubashi | ..................... 340/7.4 |
| 2006/0062400 A1 | 3/2006 | Chia-Chun | |
| 2007/0047708 A1 | 3/2007 | Boillot et al. | |
| 2007/0206829 A1 | 9/2007 | Weinans et al. | |
| 2007/0207767 A1 | 9/2007 | Reuss | |

FOREIGN PATENT DOCUMENTS

| | | |
|---|---|---|
| EP | 1317117 | 6/2003 |
| WO | WO 94/01958 | 1/1994 |
| WO | WO 2005/096602 | 3/2005 |

(Continued)

OTHER PUBLICATIONS

Bluetrek® UFO 1 Manual, English.

(Continued)

*Primary Examiner* — Danh Le
(74) *Attorney, Agent, or Firm* — Altera Law Group, LLC

(57) ABSTRACT

A wireless headset (1) for forming a connection endpoint of a communications channel with at least one further connection point (4, 26, 27). The headset (1) comprising: means (11) for attaching the headset (1) to the head of the user, a short-range receiver (2) for receiving a first signal from at least one peripheral device (4, 26), a short-range transmitter (3) for transmitting a second signal to the peripheral device (4, 26), a speaker (5) for generating a sound, selecting means (7, 10) for selecting a connection point (4, 26, 27) from at least two different connection points (4, 26, 27) and a memory (8) for storing identity information of the at least two different connection points (4, 26, 27). The headset (1) comprises voice announcement means (7, 8, 9) for announcing through the speaker (5) the identity of the selected connection point (4, 26, 27). The disclosure also relates to a method for providing a telecommunications channel, wherein the telecommunications channel comprises and endpoint formed by a wireless headset (1) as mentioned above and at least on other connection point (4, 26, 27).

21 Claims, 4 Drawing Sheets

FOREIGN PATENT DOCUMENTS

| WO | WO 2005/032109 | 4/2005 |
| WO | WO 2006/031685 | 3/2006 |
| WO | WO 2007/010288 | 1/2007 |

OTHER PUBLICATIONS

User Guide for SH440 Bluetooth® Wirelsee Headset, Multi Languages, Dec. 22, 2006.

User Guide for Nokia Wireless Image Headset HS-13W, 9311902, Issue 1, Nokia, 2005.

Bluetrek® UFO 1 Manual, English, Mar. 31, 2008.

Bluetrek® UFO 2 Manual, English, Jan. 1, 2008.

* cited by examiner

WIRELESS HEADSET WITH VOICE ANNOUNCEMENT

CROSS-REFERENCE TO RELATED APPLICATION

This application is a Continuation-In-Part of co-pending International Application Number PCT/DK2008/000205, filed on 4 Jun. 2008.

TECHNICAL FIELD

This disclosure concerns a wireless headset connected by a communications channel to an endpoint device, such as cell phone, to a further endpoint device.

BACKGROUND

A headset is a headphone, which is normally combined with a microphone, and which is becoming more and more widely used in telecommunication. Especially wireless headsets are increasingly popular.

Such headsets provide hands free operation as the user while speaking through the headset can use his hands for other purposes, such as driving his car, open doors, using a computer etc.

Wireless headsets are increasingly used with mobile phones, public switched (PSTN) phones, personal computers, softphones, transportable music players etc.

Wireless headsets following the Bluetooth standard are becoming popular, especially for use with mobile phones. But also headsets following other wireless standards such as DECT are becoming more and more popular.

Bluetooth is an industrial specification for wireless personal area networks (PANs). Bluetooth provides a way to connect and exchange information between devices such as mobile phones, headsets, laptops, personal computers, printers, GPS receivers, digital cameras, and video game consoles over a secure, globally unlicensed short-range radio frequency.

The Bluetooth standard and communications protocol is primarily designed for low power consumption, with a short range (power-class-dependent: 1 meter, 10 meters, 100 meters) based on low-cost transceiver microchips in each device.

Bluetooth enables these devices to communicate with each other when they are in range. The devices use a radio communications system, so they do not have to be in line of sight of each other, and can even be in other rooms, as long as the received transmission is powerful enough.

Because of the limited size of a headset and because it is desirable to operate it while located out of sight on the user's head or ear, interaction with the user becomes a challenge. The user interface normally consists of a few buttons and a light emitting diode. In some cases a small display is provided on the side of the headset.

Many modern mobile phones have voice dialing features so that the user can make a phone call by speaking a name instead of entering a number manually or choosing it from the internal phone book. As an example, The Nokia 6300 mobile phone has a voice dialing function, where the phone speaks a name from the internal phone book if it corresponds to a name spoken by the user. Hereafter, the phone dials the (first) number belonging to this name.

WO 2006/031685 A2 discloses a headset, which is wirelessly connected to a mobile phone and where voice tags are stored in the mobile phone. When a call is received, a previously recorded voice tag is played and the user can hear it through the headset. If no associated voice tag is stored on the mobile phone a voice-synthesized indication of the telephone number corresponding to the incoming call is sent to the headset.

US 2007/0047708 A1 discloses a wireless headset with a voice reply system for handling an incoming call. The headset is provided with a caller ID module, which can convert a caller ID present in the incoming call to caller information that can be presented acoustically to the user. The user can handle the call by spoken commands.

U.S. Pat. No. 6,760,413 B2 discloses a telephone system wherein call related information regarding a called party, such as caller ID, is returned to the calling party. In this way, the caller can be informed of the identity of the called party and in this way be confirmed that he dialed the correct number.

US 2007/0207767 A1 discloses a headset that comprises voice announcement and voice recognition, which are used to pair or connect the headset to a connection point. During the paring or connecting process, the headset asks the user for parameters. The user speaks the required information into the headset. When the connection has succeeded, a voice prompt tells the user that the headset is now connected.

During use, the headset forms a connection endpoint of a communication channel. Different devices can constitute the other endpoint. For example, the other endpoint can be a phone placed in a different house, city or country. The communication channel can contain different connection points through which communication between the two endpoints takes place. The first connection point after the headset can be a mobile phone. The next connection point is typically a nearby placed mobile phone tower. Then there are several connection points within the cabled communication network and switching system. The last connection point, which constitutes the second endpoint, is at the other end of the communication channel and is typically a mobile phone, a PSTN telephone, an IP phone (Internet Protocol telephone), a personal computer or the like. When the headset user wants to communicate via the headset, he creates a communication channel comprising connection points. Only some of these connection points can be selected by the headset user. Off course, the headset user can choose which phone number (connection point) he wants to call, but many connection points in the telecommunications network between the headset user's own phone and the called persons phone cannot be selected by the headset user. However, if the headset is connected to or can be connected to different telecommunication devices, these are typically connection points, which can be selected by the headset user.

A Bluetooth headset according to the preamble of claim 1 is sold under the brand Jabra BT 8010. This headset has a small display and a memory storing an internal phone book and a call list with the last 15 received or missed calls. It is possible to initiate a telephone call by choosing a number or contact from the phone book or call list. The Jabra BT8010 headset can be simultaneously connected to two mobile phones. One mobile phone has status as primary device and the other mobile phone has status as secondary device. It is only possible to initiate phone calls via the primary mobile phone. It is possible to change the secondary mobile phone to the primary mobile phone by pressing a button on the headset. An audio indication in the speaker indicates that the primary mobile phone has shifted. The display shows which mobile phone is the primary device and which is the secondary device.

A drawback of the Jabra BT8010 headset is that the user must take the headset off the head and study the display, if he is in doubt of which phone is the primary device.

SUMMARY

The disclosure relates to a wireless headset for forming a connection endpoint of a telecommunications channel with at least one further connection point, the headset comprising: means for attaching the headset to the head of the user, a short-range receiver for receiving a first signal from at least one peripheral device, a short-range transmitter for transmitting a second signal to the peripheral device, a speaker for generating a sound, selecting means for selecting a connection point from at least two different connection points, a memory for storing identity information of the at least two different connection points. The disclosure also relates to a method for providing a telecommunications channel, wherein the telecommunications channel comprises an endpoint formed by a wireless headset.

An object of the disclosure is to provide a wireless headset, which makes it easier for the user to select a desired connection point. The headset according to the disclosure is characterized in that the headset comprises a voice announcement generator or other means for announcing through the speaker the identity of the selected connection point. Thus, the user wearing the headset can be informed of a selected connection point without being forced to take the headset off and study a display.

According to an embodiment, the selected connection point can be one of the peripheral devices, which can be a telecommunication device, such as a mobile phone, a PSTN phone, an IP phone or a soft phone installed on a personal computer. The peripheral devices can include several devices of the same kind, such as two or more mobile phones. The peripheral device can also a headset base, which is connected to the PSTN phone or directly to the PSTN network, or even a PC. Furthermore, the peripheral device can be a dongle, such as a Bluetooth dongle, which can be connected to a personal computer or a mobile phone.

According to a preferred embodiment, the announced identity of the peripheral device is the name of the peripheral device. This name can eventually be stored in the peripheral device. Thus, the headset can receive the device name and announce it through the speaker. The name can be a specific product name such as "Nokia 6300", a generic name "mobile phone", a part of or the full serial number, a name given by a user, such as "Living room PC", "Kitchen PC", "Andy's cell phone" or the like. In a further embodiment, it is possible to generate a voice announcement together with a text announcement on the same device or a different one, even simultaneously. Thus a headset could transmit a voice announcement to a pc speaker and also to the pc screen as a pop up text. This could be useful if the speaker volume happens to be set too low or is providing some other sound function. Alternatively, the voice announcement could be sent to a pc with a text announcement sent to a mobile phone, which might not even be the same phone as linked to the headset. The text message may be a speech to text transformation of the voice announcement or it may be a completely different text message, such as a warning to listen to a voice announcement which may follow after a delay.

The selected connection point can also be a telecommunication terminal of the callee (called party) of an outgoing call.

Preferably, the memory comprises voice synthesis means, whereby device identities, telephone numbers and names can be read and acoustically announced to the user.

The memory may also be adapted for storing voice tags. In this way, the headset may speak the name of a called person or peripheral device.

According to a preferred embodiment, the memory is adapted for storing a phone book with identity information about each number stored in the phone book. Preferably, this identity information includes the name of a person.

Preferably, the memory is adapted for storing a call list comprising the phone numbers and possibly identity information of received, missed and placed calls.

The headset may comprise a microphone for generating an audio signal. The microphone can be used for recording voice tags, such as names of callees or peripheral devices.

According to a preferred embodiment, the acoustic identification is given immediately after activation of the selecting means. Thus, the user is informed immediately of the selected connection point, and especially, if the connection point is a called person, he can interrupt the call if he by mistake selected a wrong person to call.

According to a specific embodiment, the user is prompted to record a voice tag immediately after an ended telephone call. In this way, the headset helps the user to update the phone book or call lists with voice tags to make future dialing easier.

According to an embodiment the selecting means comprises a button.

The voice announcement generator/means make it unnecessary to use different buttons for different connection points. Thus, the user can easily select a connection point between a large number of connection points. The voice announcement is especially helpful when the number of selectable connection points is 3 or more.

The disclosure also relates to a method for providing a communication channel, wherein the communications channel comprises an endpoint formed by a wireless headset as mentioned above and at least one other connection point, wherein a user by means of the selecting means selects a connection point whereby the voice announcement means announces the identity of the selected connection point.

This summary is not intended to define the invention, but rather to assist the reader in understanding the remaining disclosure. The claims define the invention,

BRIEF DESCRIPTION OF THE DRAWINGS

The disclosure is explained in detail below with reference to the drawing illustrating a preferred embodiment of the disclosure and in which.

The following reference signs are used in the figures and the following detailed description of the preferred embodiment.

| | |
|---|---|
| 1 | headset |
| 2 | receiver |
| 3 | transmitter |
| 4 | mobile phone |
| 5 | headset speaker |
| 6 | headset microphone |
| 7 | processor |

-continued

| | |
|---|---|
| 8 | memory |
| 9 | speech processor |
| 10 | user interface |
| 11 | ear hook |
| 12 | headset housing |
| 13 | callee (called party) |
| 14 | mobile phone housing |
| 15 | keypad |
| 16 | display |
| 17 | mobile phone microphone |
| 18 | mobile phone speaker |
| 19 | Bluetooth link |
| 20 | Bluetooth link |
| 21 | received signal |
| 22 | transmitted signal |
| 23 | connection |
| 24 | connection |
| 25 | external communication network |
| 26 | personal computer |
| 27 | called mobile phone |
| 28 | connection |
| 29-38 | different steps during use of the headset |
| 39 | headset button |
| HS | wireless headset |
| SRC1-3 | short range wireless connections |
| C1-9 | connections |
| CP1-9 | connection points |

DETAILED DESCRIPTION

Figure 1:
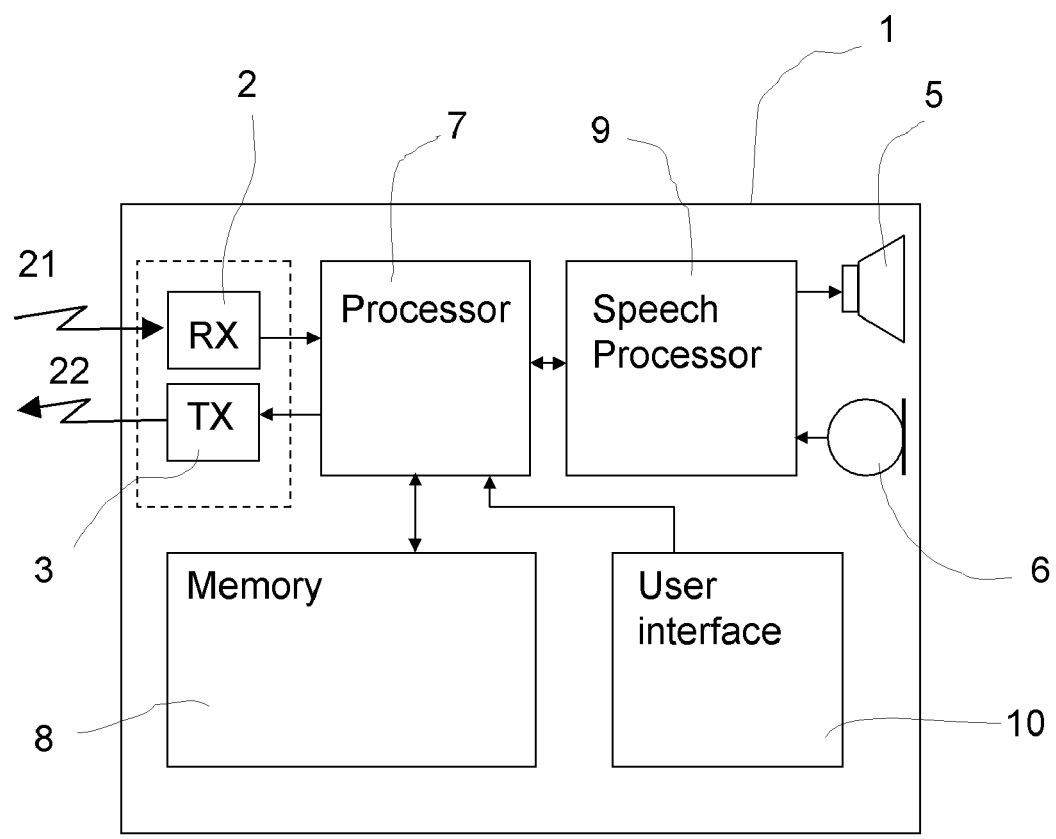
FIG. 1 is a diagram of a headset according to the disclosure.

FIG. 1 discloses a diagram of the headset 1 according to the disclosure including some of the preferable electronic parts. Thus, the headset 1 comprises a Bluetooth receiver 2 and a Bluetooth transmitter 3, which can be combined in a Bluetooth transceiver as indicated with a dotted line. Furthermore, the headset 1 comprises a processor 7, a memory 8, a speech processor 9, a user interface 10, a speaker 5 and a microphone 6.

By means of the Bluetooth receiver 2 and transmitter 3, the headset 1 can be wirelessly connected to peripheral devices also comprising a Bluetooth receiver and a Bluetooth transmitter, such as a mobile phone, a personal digital assistant (PDA) or a personal computer.

Figure 2:
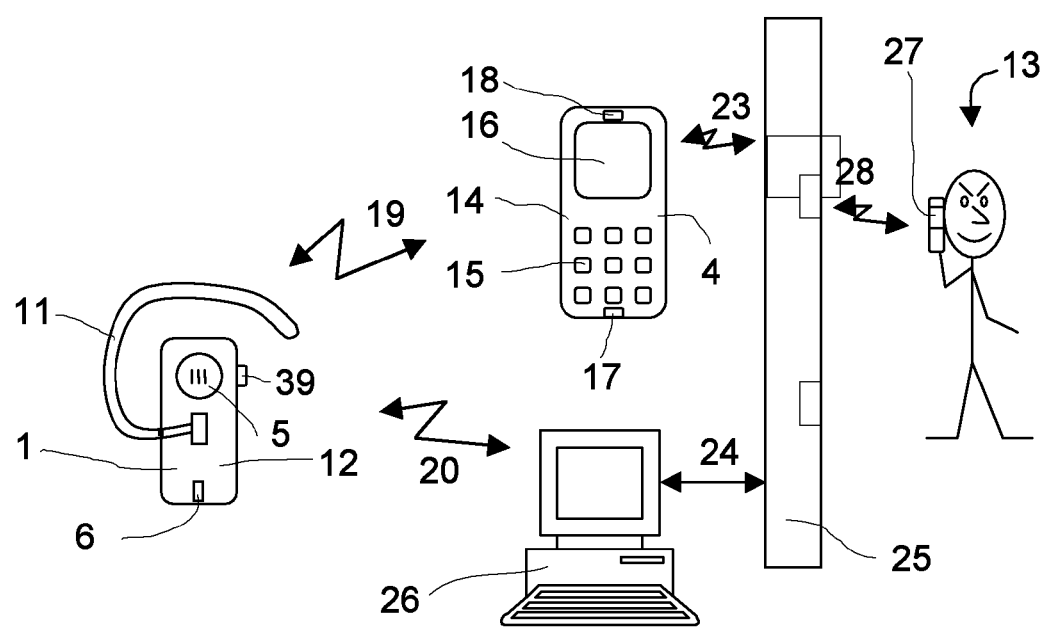
FIG. 2 is a convergence scenario, in which a headset according to the disclosure is used, shown schematically.

FIG. 2 shows a possible convergence scenario including a Bluetooth headset 1 according to the disclosure, a mobile phone 4, a personal computer 26, an external telecommunications network 25 and a callee's 13 mobile phone 27. The term convergence refers to the merging of distinct technologies, such as telephony, data and video. These previously separate technologies can now share resources and interact with each other.

The headset 1 comprises a headset housing 12 and an ear hook 11 to be arranged around the user's ear so that the speaker 5 is placed at the entrance of the ear canal and the microphone 6 points in the direction of the mouth.

The mobile phone 4 comprises a mobile phone housing 14, a keypad 15, a display 16, a microphone 17 and a speaker 18. The mobile phone 4 is wirelessly connected to the headset 1 by a Bluetooth link 19.

The personal computer 26 is by means of a Bluetooth transceiver connected to the headset 1 by a Bluetooth link 20.

The mobile phone 4 is by means of a wireless connection 23 connected to a not shown mobile phone tower belonging to the external telecommunications network 25, and the computer 26 is by means of a wired connection 24 connected to the external telecommunications network 25.

The callee's 13 mobile phone 27 is by means of a wireless connection 28 connected to the external network 25.

The external communications network 25 is a world-wide network comprising the public switched telephone network (PSTN), which is the network of the world's public circuit-switched telephone networks including fixed as well as mobile phones, and the Internet, which is the network of the world's public IP-based packet-switched networks.

A user of the headset 1 can make a call to the callee's 13 phone 27 by activating the user interface 10, which includes a headset button 39. When a call is answered by the callee 13, a communication channel is established between the headset 1 and the callee's phone 27. Between these two connection endpoints, the communication channel comprises a number of additional connection points, such as the mobile phone 4, the mobile towers within the telecommunications network, which the mobile phones 4, 27 are connected to, and other connection points within the telecommunications network 25. By means of the headset button 39 the user is able to select some of these connection points. In the system shown in FIG. 2, the user can select, whether he wants to make a call from the mobile phone 4 or a soft phone installed on a personal computer 26. The user also selects whom to call by means of the headset button 39.

As mentioned above, the headset comprises a processor 7, a memory 8 and a speech processor 9. These components constitute voice announcement means for generating an acoustic announcement of the identification of the selected connection point upon selection of this connection point. The memory 8 can be adapted to store the following:

a register of peripheral electronic devices which are paired with and/or connected to the headset via the Bluetooth receiver/transmitter a phone book with identity information, such as name and phone number, about each number stored in the phone book a call list comprising the phone numbers and possibly identity information of the last received, missed and placed calls voice tags corresponding to the peripheral electronic devices paired with and/or connected to the headset via the short range receiver/transmitter voice tags corresponding to contacts in the phone book text-to-speech software.

If the user wants to make a call from the mobile phone 4, he selects this device by activating the headset button 39. The headset speaker 5 announces the selected device, e.g. by the voice tag "mobile phone", or "Peters cell phone" or "Nokia 6300" or the like. Thus, the headset user is acoustically informed about which device is selected. The voice tags can be recorded through the headset microphone 6 and stored in the headset memory 8. The memory 8 also stores a phone book with identity information about each number stored in the phone book. When the user by means of the user interface 10 selects a contact to call from the phone book, the headset speaker 5 announces the contact identity by speaking a recorded voice tag, such as "Mr. X" or announcing the name by text-to-speech synthesis or saying the phone number. Correspondingly, the user can select a contact or phone number from a call list saving the numbers from the last (e.g. 10 or 20) received, misses and placed calls.

Figure 3:
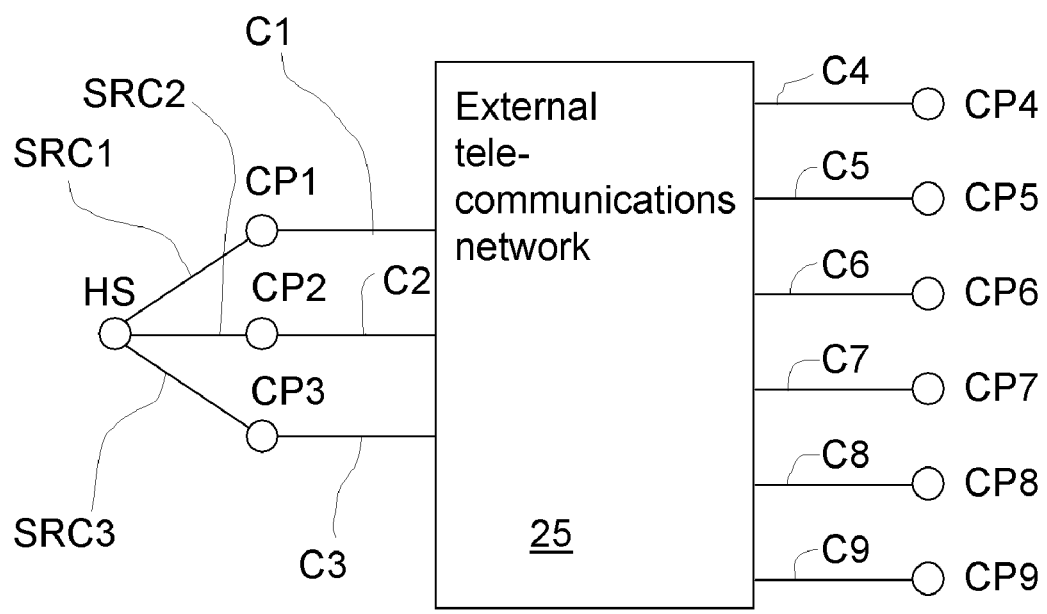
FIG. 3 is diagram showing a communication network comprising a headset according to the disclosure.

While FIG. 2 discloses an example of how a headset 1 according to the disclosure can be used in a specific situation, FIG. 3 shows in a general diagram how a headset according to the disclosure can be a part of a communications network with generally termed connection points. The headset is designated HS, and it can via a wireless short-range connection SRC1, SRC2, SRC3 be connected to one of the connection points CP1, CP2 or CP3. The wireless short-range connection can make use of electromagnetic radiations in form of infrared light, microwaves or radio waves. The connection points CP1, CP2 and CP3 can be a mobile phone, a public switched (PSTN) phone, a personal computer, transportable music player, a personal digital assistant (PDA) or the like. The connection points CP1, CP2 and CP3 are all connected to the external telecommunications network 25 by means of the connections C1, C2 and C3. The external telecommunications network 25 is the worldwide network of public phone companies, Internet providers etc. connecting phones and computers all over the world.

The connection points CP4-CP9 are callee's phones or computers that are connected to the external telecommunications network 25 via connections C4-C9. Off course, also the callee could use a headset.

The headset user can by means of the headset user interface initiate a communication channel to a callee by selecting one of the connection points CP1-CP3 and one of the selection points CP4-CP9 (callee). In most cases, the connection points within the external communications network 25 can not be selected by the user. However, it could be envisaged that the user is allowed to select between different telephone companies or servers within the external telecommunications network 25 and in this case, he would be able to select between different connection points within the external telecommunications network 25.

It could also be envisaged, that the headset user would be allowed to select between different connection points in local area network (LAN) or personal area network (PAN) at the callee's end of the telecommunication channel. Thus, the user could call a company by using the headset user interface and select a local number within the company.

Figure 4:
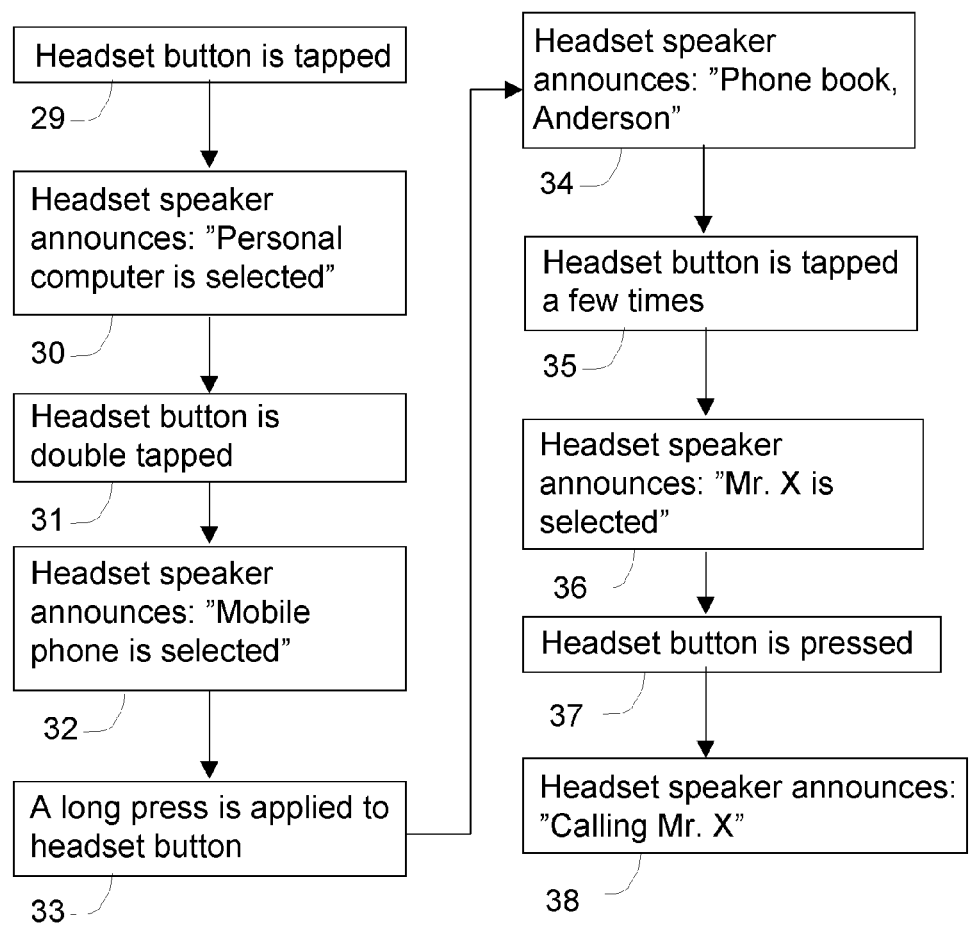
FIG. 4 is a block diagram showing different steps during use of the headset according to the disclosure.

The block diagram disclosed in FIG. 4 shows different steps during use of the headset according to the disclosure. A typical situation disclosing the advantage of the headset according to the disclosure is explained in the following:

Mr. Hansen is sitting at his office desk in an open plan office. He is wearing a small Bluetooth headset according to the disclosure. The headset has a multi-function button (MFB) as a part of its user interface. Depending on how the button is pressed, different commands can be given to the headset. Thus, a short tap, a double tap, a press (1-3 seconds) and a long press (>3 seconds) can be applied. The headset is connected to his desktop computer, so Mr. Hansen can listen to sound alerts from his computer without disturbing his colleagues. Small "quiet rooms" for longer and/or private telephone conversations lies in relative short distance from Mr. Hansen's desk. Mr. Hansen's mobile phone lies in his pocket. He wants to call a business relation Mr. X. Mr. X is a busy person and does frequently not answer phone calls.

In step 29, Mr. Hansen taps the button on his headset. As shown in step 30, the headset speaker announces to Mr. Hansen, that his personal computer is the current device selected by the headset. Mr. Hansen double taps the headset button to select his mobile phone as connection point, which is indicated in step 31. In step 32, the headset speaker now announces, that the mobile phone is the selected device. The headset has an internal phone book with 20 contacts. Mr. Hansen activates the phone book by applying a long press to the button in step 33. In step 34 the headset speaker announces, that the phone book is activated, and announces immediately after the first name in the phone book, which is "Anderson". Mr. Hansen can toggle between the contacts in the phone book by tapping the headset button. After each tap, the next name in the phone book is announced. After a few taps in step 35 Mr. Hansen finds Mr. X, which is announced by the headset speaker in step 36. Mr. Hansen presses the headset button in step 37, and the headset speaker announces that a call to Mr. X is initiated in step 38. If Mr. X answers the call, Mr. Hansen can leave his desk and walk to a quiet room. He does not have to take his mobile phone out of the pocket at any moment.

The above scenario is only an example. The user interface used for selecting connection points could be different and include more buttons, so that complex pressing types could be avoided. The user interface of the headset could also include "voice commands", so that the user inputs are spoken commands received by the headset microphone. As an example, the voice command "open phone book" would force the headset to open the phone book.

The headset can also be adapted to give an acoustic announcement through the speaker of mobile headset status or phone status, such as battery level. Thus, the headset could say "mobile battery 90% charged" or "headset status: 20 minutes talk time left".

By the term "short-range" is meant wireless connection close to the person using the network thus up to 100 meter. Often the term "wireless personal area network" (WPAN) is used in this connection.

The term "voice tag" could be replaced by the voice token and be recorded by the headset user directly through the headset microphone or be transferred to the headset from e.g. a personal computer. It could also be recorded by a third party such as calling or called party.

The terms "connection point" could be replaced with the term "node".

The term "channel" could be replaced by the essentially synonymous term "link". By the terms "channel" and "link" is meant the path starting from the headset and ending at the callee's telecommunications terminal. A more precise term often used in this connection is "point-to-point link".

The Bluetooth standard allows the headset to be simultaneously connected to two peripheral devices, but the user interface commands are only orientated towards one.

The invention claimed is:

1. A wireless headset for forming a connection endpoint of a communications channel with at least one further connection point, the headset comprising:
    a short-range receiver for receiving a first signal from at least one peripheral device,
    a short-range transmitter for transmitting a second signal to the peripheral device,
    a speaker for generating a sound,
    a selector capable of selecting a connection point from at least two different connection points,
    a memory for storing identity information of the at least two different connection points, said headset further including a voice announcement generator for announcing through the speaker the identity of the selected connection point and wherein the selected connection point can be one of a plurality of telecommunications peripheral devices.

2. The headset according to claim 1, wherein the selected connection point can be a plurality of the peripheral devices.

3. The headset according to claim 2, wherein the announced identity of the peripheral device is the name of the peripheral device.

4. The headset according to claim 2, wherein the peripheral device is a mobile phone.

5. The headset according to claim 1, wherein the selected connection point can be a telecommunication terminal of the callee of an outgoing call.

6. The headset according to claim 1, wherein the memory comprises voice synthesis means.

7. The headset according to claim 1, wherein the memory is adapted for storing voice tags.

8. The headset according to claim 1, wherein the memory is adapted for storing a phone book with identity information about each number stored in the phone book.

9. The headset according to claim 1, wherein the memory is adapted for storing a call list comprising the phone numbers and possibly identity information of received, missed and placed calls.

10. The headset according to claim 1, wherein the headset includes a microphone.

11. The headset according to claim 1, wherein the selector comprises a button, which is used for selecting a connection point.

12. The headset of claim 1, wherein the announcement generator further generates a text display which may be received on a peripheral display device for indicating the substance of the voice announcement, as an alternate method by which the user may know which connection point is engaged.

13. The headset of claim 1, wherein one of the peripheral devices includes a phone book and said selector permits the user to toggle between said phone book and a further peripheral device to place a phone call, and wherein said headset issues a voice announcement whenever the connection point is changed, so that the user is appraised of the current connection.

14. The headset of claim 1, wherein said selector is initiated by voice command of the user.

15. Method for providing a communications channel, having a short-range receiver for receiving a first signal from at least one peripheral device,
 a short-range transmitter for transmitting a second signal to the peripheral device,
 a speaker for generating a sound, a selector capable of selecting a connection point from at least two different connection points, a memory for storing identity information of the at least two different connection points comprising;
 having a user select a particular connection point, transmitting a signal to said connection point, generating a voice announcement in said at least one peripheral device telling the user which connecting point has been used.

16. The method according to claim 15, wherein the acoustic announcement is given immediately after activation of the selector selecting means.

17. The method according to the claim 15, wherein the user by means of the announcement generator is prompted to record a voice tag immediately after an ended telephone call.

18. The method of claim 15 further including the step of the announcement generator further providing a text indicator on the screen of the selected connection point, indicating that the device is the selected device for voice announcements.

19. A wireless headset system for forming a connection endpoint of a communications channel with at least one further connection point, the headset comprising:
 a short-range receiver for receiving a first signal from at least one peripheral device,
 a short-range transmitter for transmitting a second signal to the peripheral device,
 a speaker for generating a sound,
 a selector capable of selecting a connection point from at least two different connection points,
 a memory for storing identity information of the at least two different connection points, said headset further including a voice announcement generator for announcing through the speaker the identity of the selected connection point and wherein the selected connection point can be one of a plurality of telecommunications peripheral devices, wherein the announcement generator further provides a text indicator transmitted to a display of peripheral device, for indicating which device has been sent a voice announcement.

20. The system of claim 19, wherein said peripheral device receiving a text indictor is a PC with a display.

21. A wireless headset capable of forming a connection to a plurality of peripheral devices via a communications channel, the headset comprising:
 a short-range receiver for receiving a first signal from a plurality of peripheral devices,
 a short-range transmitter for transmitting a second signal to a plurality of peripheral devices,
 a speaker for generating sound,
 a selector capable of selecting a connection point from at least two different connection points,
 a memory for storing identity information of the at least two peripheral devices, said headset further including a voice announcement generator capable of detecting which peripheral device the headset is connected to, reading from said memory the identity of said device and transmitting audible announcement through the speaker in the headset, the identity of the selected peripheral device wherein the selected device can be one of a plurality of peripheral devices.

* * * * *